W. DUKES.
ROAD VEHICLE WHEEL.
APPLICATION FILED OCT. 24, 1921.

1,417,152.

Patented May 23, 1922.

Inventor
W. Dukes,
By Marks&Clerk
Attys

UNITED STATES PATENT OFFICE.

WILLIAM DUKES, OF COVENTRY, ENGLAND, ASSIGNOR TO THE WARLAND DUAL RIM COMPANY, LIMITED, OF COVENTRY, WARWICK, ENGLAND.

ROAD-VEHICLE WHEEL.

1,417,152.   Specification of Letters Patent.   Patented May 23, 1922.

Application filed October 24, 1921. Serial No. 510,076.

*To all whom it may concern:*

Be it known that I, WILLIAM DUKES, a subject of the King of Great Britain and Ireland, residing at Lythalls Lane, near Foleshill, Coventry, in the county of Warwick, England, have invented certain new and useful Improvements Relating to Road-Vehicle Wheels, of which the following is a specification.

This invention relates to road vehicle wheels of the type in which a detachable rim carrying a pneumatic or other tyre is mounted between a fixed and a detachable flange on the wheel periphery. The object of the invention is to provide an improved wheel construction adapted particularly to what are known as "flat sided" tyres.

Hitherto the detachable rim has been formed with a pair of grooved edges for engagement by beaded edges on the inner periphery of the tyre, and this rim has been mounted between grooves in the fixed and detachable wheel flanges. Also the rim has been made contractible to permit convenient application and withdrawal of the tyre. The said construction is, however, not suitable for flat sided tyres as the latter have no beaded edges which can be engaged by the rim.

According to the present invention we employ a flanged detachable rim which is made contractible or collapsible and in which the inner sides of the flange are at right angles to the base of the rim, the outer sides of the flanges being adapted to be engaged by grooves in the fixed and detachable wheel flanges.

Referring to the accompanying sheet of explanatory drawings:—

Figure 1:
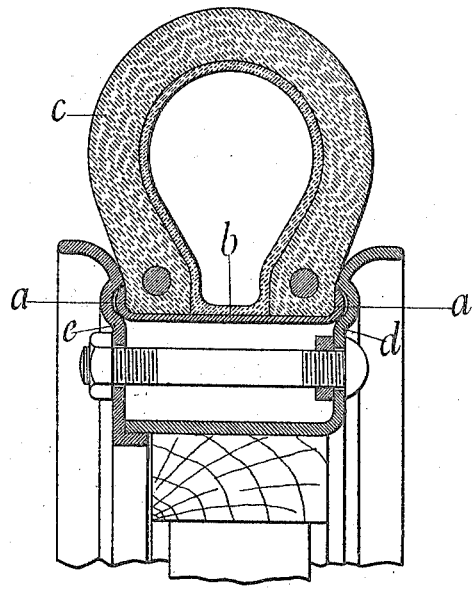
Figure 1 is a cross section of the peripheral portion of a wheel constructed in accordance with this invention.
Figure 2:
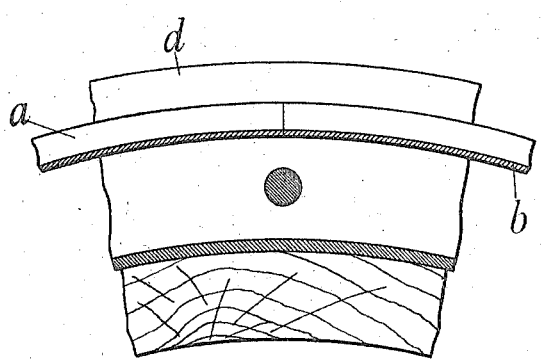
Fig. 2 is a sectional side elevation of a portion of the wheel.

In carrying the invention into effect as shown, the detachable rim is made of channel section providing a pair of outward flanges $a$ at the opposite edges of the base or main portion $b$ of the rim on which the tyre as $c$ is placed. The inner sides of these flanges are at right angles to the base, and the outer sides are rounded in cross section to engage correspondingly shaped grooves in the main fixed and detachable flanges $d, e$ of the wheel. The outer circumferential portions of the latter flanges are preferably splayed outwardly as shown to avoid cutting of the tyre.

The detachable rim can be made contractible in any convenient manner. Thus it may be divided transversely so that in the process of contraction one end can be caused to overlap the other. Or it may be fitted with a short removable segment, which when removed permits the ends of the rim to be brought together. Or the rim may be constructed with one or more relatively long segments enabling the rim to be collapsed.

By this invention a well known wheel construction extensively employed for beaded-edge tyres is very conveniently adapted for flat sides tyres.

Having thus described my invention what I claim as new and desire to secure by Letters Patent is:—

In a road vehicle wheel of the type specified the combination of a detachable rim for carrying a tire having flanges at its edges, the inner sides of the flanges being arranged at right angles to the peripheral surface of the rim and the outer sides being of convex form, coacting fixed and detachable flanges on the wheel and each having an inner groove to grip the outer curved surface of the flanges of the rim and outwardly flared circumferential portions and means for clamping the flanges on the wheel and about the rim, substantially as described.

In testimony whereof I have signed my name to this specification.

WILLIAM DUKES.